Feb. 28, 1933.   W. M. BAILEY   1,899,176

HIGH FREQUENCY CONDENSER

Filed Oct. 24, 1929

INVENTOR
William M. Bailey
BY
ATTORNEY

Patented Feb. 28, 1933

1,899,176

UNITED STATES PATENT OFFICE

WILLIAM M. BAILEY, OF LYNN, MASSACHUSETTS, ASSIGNOR, BY MESNE ASSIGNMENTS, TO GENERAL ELECTRIC COMPANY, A CORPORATION OF NEW YORK

HIGH FREQUENCY CONDENSER

Application filed October 24, 1929. Serial No. 402,163.

This invention relates to an improved capacitor and more particularly to one designed for use in high frequency circuits.

As is well known, in the high frequency circuits, considerable quantities of energy are dissipated, particularly in the conductors or armatures of capacitors. In such devices, the eddy currents set up in any considerable body of metal such as capacitor armatures or the like, develop sufficient heat either to puncture the dielectric or even melt the metal if foil be used as the armature. It has been proposed hitherto to use notched plates for avoiding the difficulties arising from the eddy currents normally associated with high frequency installations.

It is an object of the present invention to provide an improved capacitor in which the armatures are notched as formed with fingers and so arranged with respect to each other as to substantially reduce eddy current losses in the armatures.

It is a further object of this invention to provide such a device in a capacitor which may use a wide variety of dielectric between armatures.

These and other desirable objects and advantages of the present invention will be described in the specification and illustrated in the accompanying drawing, it being understood that the form shown is given as a preferred embodiment of the invention, but since the underlying principles may be applied to other specific structures, it is not intended to be limited to the one here shown except as such limitations are clearly imposed by the appended claim.

Of the drawing

Figure 1:
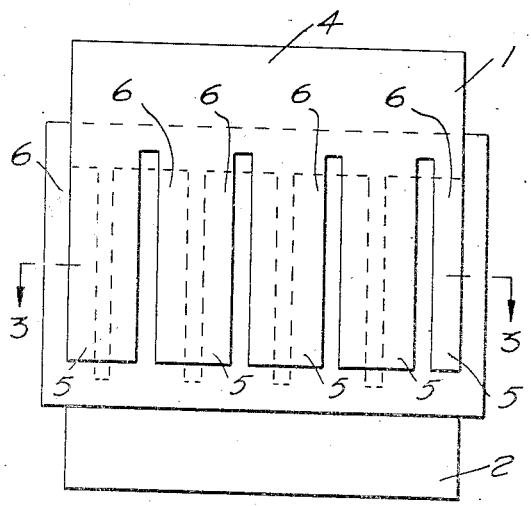
Fig. 1 is a top plan view of a capacitor assembly showing armatures of opposite polarity and an interposed dielectric.

The exemplary structure generally comprehends a plurality of armatures of opposite polarity designated generally as 1 and 2. The armatures each generally comprises, as at 1, Fig. 1, a continuous supporting portion 4 and a plurality of fingers or active portions 5 integral therewith which may be of any suitable configuration and size. For purposes of comparison, the active portions or fingers of member 2 are designated generally by the numeral 6, although the construction of both members 1 and 2 is identical thruout. Fig. 2 shows in edge view, two groups of armatures of three armatures each, the three armatures in each group being connected together outside their active areas. The electrostatically active areas of these armatures consist of the fingers 5 and 6.

Figure 2:
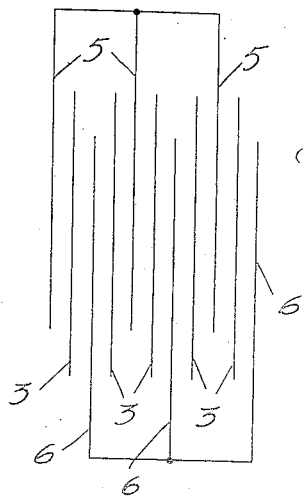
Fig. 2 is a dilated edge view of a capacitor assembly showing a plurality of armatures and intervening dielectric.
Figure 3:
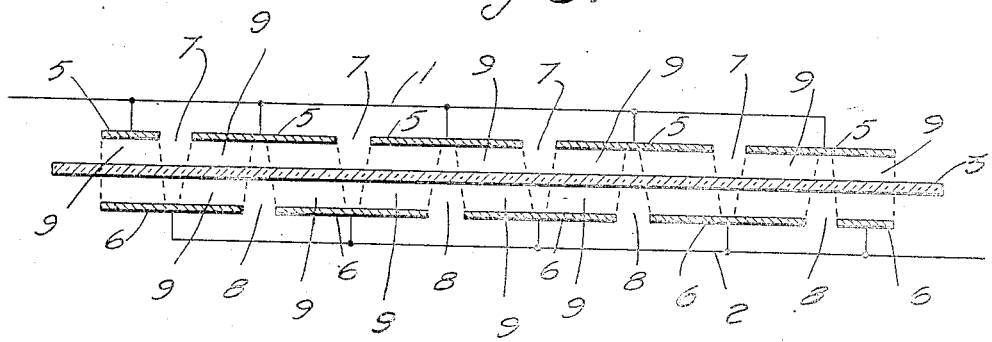
Fig. 3 is a diagram including circuit connections and a cross-section taken on line 3—3 of Fig. 1 with the parts vertically spaced apart to show more clearly their relative positions.

Successive armatures are alternately disposed with respect to each other, Fig. 3, so that the several fingers 5, 6 overlie each other in the manner shown in Figs. 1 and 3. The spaces between the fingers 5 of armature 1 are designated, Fig. 3, by numeral 7 and the corresponding spaces between fingers 6 of armature 2 are designated by the numeral 8. In the preferred embodiment of this invention shown in Fig. 3, the armatures are so arranged in the stack with respect to each other as to locate the spaces 7 and 8 centrally of the active portions 5 and 6 of the opposing armatures.

Referring now to Fig. 3, it will be noted that in operation, the electrostatic fields set up between the opposed armature fingers 5 and 6 and also the currents in said armatures will be divided or split up into a plurality of almost parallel but divergent areas 9 successively extending between the opposing active finger portions of the armatures in such a manner as indicated in dotted lines as to provide a plurality of short paths laterally spaced apart. Thus the areas or spaces 7 and 8, between such paths free from currents, serve as barriers between the eddy currents developed around the areas 9, thereby reducing heat generated in operation. This construction also has the added advantage that a given configuration of armatures may be used in any desired number and for opposite polarities by merely juxtaposing them in desired relationship with any suitable dielectric such as 3 located therebetween.

It will now be seen that there has been provided an improved capacitor which is made up of a plurality of armatures of which the active portions include fingers so arranged as to reduce eddy current losses in the active portions of the armatures.

The construction shown and described is highly economical in manufacture and very efficient in operation.

What is claimed is:

A capacitor including cooperating armatures respectively having a plurality of spaced fingers and a common conducting support therefor, said armatures being alternately disposed with respect to each other so as to provide a plurality of divergent electrostatic fields between the fingers of the armatures of opposite polarity thereby reducing eddy current losses in the active portions of the armatures.

In testimony whereof I hereunto affix my signature.

WILLIAM M. BAILEY.